(12) United States Patent
Weedon (10) Patent No.: US 6,799,188 B2
(45) Date of Patent: Sep. 28, 2004

(54) TRANSACTION PROCESSING SYSTEM PROVIDING IMPROVED METHODOLOGY FOR TWO-PHASE COMMIT DECISION

(75) Inventor: Jonathan K. Weedon, Half Moon Bay, CA (US)

(73) Assignee: Borland Software Corporation, Scotts Valley, CA (US)

( * ) Notice: Subject to any disclaimer, the term of this patent is extended or adjusted under 35 U.S.C. 154(b) by 411 days.

(21) Appl. No.: 10/040,032

(22) Filed: Oct. 22, 2001

(65) Prior Publication Data

US 2003/0046298 A1 Mar. 6, 2003

Related U.S. Application Data

(60) Provisional application No. 60/316,827, filed on Aug. 31, 2001.

(51) Int. Cl.[7] .............................................. G06F 17/30
(52) U.S. Cl. ............................ 707/202; 707/8; 707/10; 707/104.1; 709/203; 709/219; 718/101
(58) Field of Search ............................ 707/8, 10, 102, 707/104.1, 201; 709/203, 219; 718/101

(56) References Cited

U.S. PATENT DOCUMENTS

| | | | |
|---|---|---|---|
| 5,241,675 A | | 8/1993 | Sheth et al. .................... 707/8 |
| 5,291,594 A | | 3/1994 | Sekiguchi et al. ........... 707/210 |
| 5,561,797 A | * | 10/1996 | Gilles et al. .................... 707/8 |
| 5,734,896 A | | 3/1998 | Rizvi et al. .................. 707/202 |
| 5,799,305 A | | 8/1998 | Bortvedt et al. ............. 707/10 |
| 5,852,732 A | * | 12/1998 | Freund et al. .............. 718/101 |
| 5,884,327 A | | 3/1999 | Cotner et al. ................ 707/202 |
| 5,890,161 A | * | 3/1999 | Helland et al. .......... 707/103 R |
| 5,924,095 A | | 7/1999 | White ........................... 707/10 |
| 5,953,719 A | | 9/1999 | Kleein et al. .................. 707/8 |
| 6,070,165 A | * | 5/2000 | Whitmore .................... 707/101 |
| 6,151,602 A | * | 11/2000 | Hejlsberg et al. ............. 707/10 |
| 6,157,927 A | * | 12/2000 | Schaefer et al. ........ 707/103 R |
| 6,275,843 B1 | * | 8/2001 | Chorn ......................... 718/101 |
| 6,029,177 A1 | | 7/2002 | Sadiq et al. ................. 707/201 |
| 6,418,455 B1 | | 7/2002 | Horowitz et al. ........... 707/202 |
| 6,493,726 B1 | | 12/2002 | Ganesh et al. .............. 707/201 |
| 6,557,082 B1 | | 10/2003 | Josten et al. ................. 711/141 |
| 6,631,374 B1 | | 10/2003 | Klein et al. .................... 707/8 |
| 6,636,851 B1 | | 10/2003 | Bamford et al. ............... 707/8 |
| 6,651,073 B1 | | 11/2003 | Lyle et al. .................. 707/202 |
| 2001/0056428 A1 | * | 12/2001 | Gajda et al. ................ 707/100 |

* cited by examiner

Primary Examiner—Jean R. Homere
Assistant Examiner—Leslie Wong
(74) Attorney, Agent, or Firm—John A. Smart; G. Mack Riddle (57) ABSTRACT

A transaction processing system providing improved methodology for invoking two-phase commit protocol (2PC) is described. More particularly, a transaction is handled without use of 2PC until the system determines that the transaction does, in fact, involve changes to more than one database. The methodology improves overall system performance by looking at each transaction to determine whether the transaction actually requires use of 2PC before incurring the overhead associated with use of the two-phase commit protocol. Because only a small percentage of real world transactions result in updates to more than one database, the methodology improves the overall performance of transaction processing systems considerably.

53 Claims, 6 Drawing Sheets

TRANSACTION PROCESSING SYSTEM PROVIDING IMPROVED METHODOLOGY FOR TWO-PHASE COMMIT DECISION

RELATED APPLICATIONS

The present application is related to and claims the benefit of priority of the following commonly-owned provisional application(s): application serial No. 60/316,827 (Docket No. BORL/0201.00), filed Aug. 31, 2001, entitled "Transaction Processing System Providing Improved Methodology For Two-Phase Commit Decision", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing environments and, more particularly, to computer-implemented methodology related to two-phase commit decisions in transaction processing systems.

2. Description of the Background Art

Today, most computers are linked to other computer systems via a computer network. Well-known examples of computer networks include local-area networks (LANs) where the computers are geographically close together (e.g., in the same building), and wide-area networks (WANs) where the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (i.e., disk drives), printers, modems, or the like. Servers are often dedicated, meaning that they perform no other tasks besides their server tasks. For instance, a database server is a computer system that manages database information, including processing database queries from various clients. The client part of this client-server architecture typically comprises PCs or workstations which rely on a server to perform some operations. Typically, a client runs a "client application" that relies on a server to perform some operations, such as returning particular database information. Often, client-server architecture is thought of as a "two-tier architecture," one in which the user interface runs on the client or "front end" and the database is stored on the server or "back end." The actual business rules or application logic driving operation of the application can run on either the client or the server (or even be partitioned between the two). In a typical deployment of such a system, a client application, such as one created by an information service (IS) shop, resides on all of the client or end-user machines. Such client applications interact with a host database system (e.g., Borland Interbase®), which execute business logic (e.g. within database stored procedures) that traditionally ran at the client machines.

Database systems are well documented in the technical, trade and patent literature. See e.g., Date, C. "An Introduction to Database Systems, Volume I and II," Addison Wesley, 1990, the disclosure of which is hereby incorporated by reference. A more technical review is provided by Gray, J. and Reuter, A., "Transaction Processing: Concepts and Techniques," Morgan Kaufmann Publishers, 1993, the disclosure of which is hereby incorporated by reference.

More recently, the development model has shifted from standard client/server or two-tier development to a three-tier, component-based development model. This newer client/server architecture introduces three well-defined and separate processes, each typically running on a different platform. A "first tier" provides the user interface, which runs on the user's computer (i.e., the client). Next, a "second tier" provides the functional modules that actually process data. This middle tier typically runs on a server, often called an "application server." A "third tier" furnishes a database management system (DBMS) that stores the data required by the middle tier. This tier may run on a second server called the database server.

Three-tier database systems are well documented in the patent and trade literature; see, e.g., U.S. Pat. No. 6,266,666, entitled "Component transaction server for developing and deploying transaction-intensive business applications", the disclosure of which is hereby incorporated by reference.

The three-tier design has many advantages over traditional two-tier or single-tier designs. For example, the added modularity makes it easier to modify or replace one tier without affecting the other tiers. Separating the application functions from the database functions makes it easier to implement load balancing. Thus, by partitioning applications cleanly into presentation, application logic, and data sections, the result will be enhanced scalability, reusability, security, and manageability.

In the three-tier model, communication must occur among the various tiers, such as from a client to a middle tier, and from the middle tier to one or more back-end databases. One of the advantages of employing a middle tier is to pool together connections to the database in a central (middleware) tier, thus allowing more efficient access to the database. In particular, database connections, which are expensive in terms of system and network resources, are cached in the middle tier.

Another advantage of the middle tier is to offload certain computations from the back-end databases, particularly those pertaining to business logic (i.e., business objects). Exploiting this advantage, a system administrator would deploy a middle tier on a separate server computer, one that was physically separate from the computers hosting the back-end databases.

In many cases, a particular application may access and modify data that is stored in several different databases, including ones provided by different vendors. For example, a banking application may access customer checking account information stored in one database as well as savings account information stored in a second database. In commercial transaction processing systems there is frequently a need to coordinate the process of making changes to multiple databases because a single transaction can update many different databases. For example, in a consumer banking application, an account holder may wish to transfer $500 from his or her savings account to his or her checking account. This transaction actually involves a pair of operations. The first operation is to remove (or debit) $500 from the savings account. The second operation is to add (or credit) $500 to the checking account. Both the bank and the account holder want to ensure that if the bank's computer system crashed in the middle of this transfer, there is a way to make sure that either the $500 is posted to the checking account, or, alternatively, that the $500 is not removed from the savings account. It is unacceptable if the funds are removed from savings, but are not credited to checking. In other words, this transaction requires a mechanism to guarantee "atomicity." Atomicity means that all actions that take place as part of a transaction are executed as a single atomic operation and that either they all complete, or none of them complete.

In transactions involving a single database, atomicity typically involves the following operations which are all handled as part of the standard operations of the database management system:

1. Begin: Beginning a transaction creates a transaction scope. From the time the transaction is begun until it is successfully committed or rolled back, operations against the database will be within the scope of the transaction and will either all succeed or all fail.
2. Commit: Committing a transaction tells the database that all processing has completed satisfactorily, and that the results should be written to persistent storage. Before a commit is issued, changes may be undone by issuing a "rollback" command. If there is a system crash prior to a commit, on recovery the database will revert to the state it was in before the transaction was begun. Executing the commit ends the transaction.
3. Rollback: Rolling back a transaction revokes any changes that occurred during the transaction, leaving the database in the state in which it was found prior to the transaction. After a transaction is committed, it can no longer be rolled back.

Two-phase commit (or "2PC") is a well-known technique to synchronize multiple resources and to provide the guarantee of atomicity that is required in transaction processing systems. The two-phase commit protocol has two phases that are typically referred to as "Prepare" and "Commit." In the Prepare stage, all resource managers (databases most typically) participating in the transaction are told by a transaction manager to prepare to commit their changes. The databases are instructed to perform all processing steps short of writing the updates to persistent storage. After each database completes the "Prepare" phase, it sends a reply to the transaction manager indicating success (vote commit) or failure (vote rollback). After a database votes commit (indicating success), it may not initiate a rollback and may only implement a rollback if instructed to do so by the transaction manager.

The transaction manager collects the replies from all the involved databases. A single vote rollback results in the rollback of the entire transaction. If the transaction manager receives no response from one of the participants, it assumes the operation has failed and rolls back the transaction. The transaction manager rolls back the transaction by sending a rollback instruction to all participating databases.

If the Prepare stage has completed satisfactorily (i.e., if all databases voted commit), the transaction manager enters the Commit phase. In this phase, the transaction manager instructs each of the participating databases to commit their changes. After completion, each database reports to the transaction manager that it has completed the transaction. When all databases report completion, the transaction is completed. The two-phase commit protocol is described in more detail in the Open Group Technical standard titled "Distributed TP: The XA Specification," C193, ISBN 1-872630-24-3, February, 1992, and in the Open Group Guide titled "Distributed TP: Reference Model, Version 3," G504, ISBN 1-85912-170-5, February 1996, the description of which are hereby incorporated by reference.

Unfortunately, participating in two-phase commit is relatively expensive, in terms of overhead on transaction performance, as a result of having to involve a transaction manager to coordinate the above-described process of making changes across multiple systems. This two-phase commit process involves several additional steps that are not required for transactions involving only database reads or changes to only one database. As a result, performance is slowed in transactions in which the two-phase commit protocol is used.

Very frequently, however, a given transaction involving an application accessing data in more than one database does not actually make any changes (i.e., it is a read-only transaction). In many other situations, a given transaction involves changes being made to only one of the participating databases. In such cases, it would be advantageous to avoid the setup overhead of two-phase commit for transactions that do not involve changes to more than one database.

Unfortunately, however, it is usually difficult to determine in advance whether a given transaction will require changes to multiple systems, due to the fact that most transactions have data driven behavior (meaning that the behavior is based on data inputs and it is therefore difficult to predetermine the behavior). Therefore, existing transaction processing systems typically make the pessimistic assumption that all transactions require two-phase commit, thereby always incurring the performance overhead of setting up two-phase commit even though it is not required for many transactions.

One approach to handle this problem is to configure a system such that two databases can never participate in a single transaction. This configuration avoids the two-phase commit overhead, but introduces an application-level limitation that is frequently unacceptable to a customer trying to deploy a particular database solution.

Existing transaction processing systems typically always incur the overhead of setting up two-phase commit even though only a small percentage of transactions actually result in changes being made to more than one database. To improve the performance of transaction processing systems, there is a need for an improved system and methodology for use of the two-phase commit protocol.

Glossary

The following definitions are offered for purposes of illustration, not limitation, in order to assist with understanding the discussion that follows.

Application server: Also called an "appserver," this is a middleware program/process that handles all application operations between users and an organization's back-end business applications or databases. Application servers are typically used for complex transaction-based applications. To support high-end needs, an application server must have built-in redundancy, monitors for high-availability, high-performance distributed application services, and support for complex database access.

Commit: This is a database command to make changes to data permanent. In the context of a database transaction, a transaction "commits" when all pending changes (if any) to a target database(s) are made permanent.

Java: A general purpose programming language developed by Sun Microsystems. Java is an object-oriented language similar to C++, but simplified to eliminate language features that cause common programming errors. Java source code files (files with a .java extension) are compiled into a format called bytecode (files with a class extension), which can then be executed by a Java interpreter. Compiled Java code can run on most computers because Java interpreters and runtime environments, known as Java Virtual Machines (JVMs), exist for most operating systems, including UNIX, the Macintosh OS, and Windows. Bytecode can also be converted directly into machine language instructions by a just-in-time compiler (JIT). Further description of the Java Language environment can be found in the technical, trade, and patent literature; see e.g., Gosling, J. et al., *The Java Language Environment: A White Paper*, Sun Microsystems Computer Company, October 1995, the disclosure of which is hereby incorporated by reference.

Rollback: This is a database command to undo all work since the transaction was begun.

SQL: Structured Query Language is a well-known language for processing database information.

Transaction: A unit of work performed against one or more databases. A transaction may be successfully concluded by a "commit" operation, whereupon all pending changes (if any) are written to the database(s).

Transactional control: The ability to manage various transactions that may occur within a relational database management system.

Two-phase commit protocol: The two-phase commit protocol is the most widely used atomic commitment protocol and is supported by all modem commercial database systems and transaction processing monitors. The two-phase commit protocol was developed by the Open Group (formerly the X/Open Company Limited) and has been standardized by the International Standards Organization (ISO92).

XA: The Open Group XA specification defines a set of application programming interfaces (APIs) or commands that work with the underlying standard two-phase commit protocol. In order to participate in an XA-defined two phase commit, transaction managers and resource managers must map their private two-phase commit protocols to the XA commands. In this document references to "XA" shall refer generally to this set of application program interfaces.

SUMMARY OF THE INVENTION

In general, most real world transactions on transaction processing systems do not access multiple data sources. Rather, in a majority of transactions only one data source is accessed. In addition, transactions typically read from databases much more frequently than they write to databases. Thus, an even smaller percentage of transactions result in updates (changes) being written to more than one database.

Although the transactions resulting in updates to multiple databases are very rare, existing transaction processing systems typically require use of the two-phase commit protocol ("2PC") for every transaction. This results in a considerable performance penalty on the operations of the system.

The present invention provides a transaction processing system incorporating improved methodology for invoking 2PC only when it is needed. Using this improved methodology, the transaction is handled without use of 2PC until it is determined that the transaction does, in fact, involve updates to more than one database. The present invention introduces a decision between the "read" and "write" halves of the transaction. The decision determines how many systems (if any) need to be changed (or written) during the "write" half of the transaction. If less than two systems require modification (i.e., if no changes are made or if changes are only made to one database), then the "write" half of the transaction can proceed without using 2PC. In this way 2PC is only used when two or more systems are modified and the overhead associated with two-phase commit is avoided when it is not necessary.

An improved method providing or supporting two-phase commit protocol (2PC), particularly in the context of accessing multiple databases, may be summarized as follows. In response to a transaction initiated by a client (e.g., via SQL query commands), a transaction processing system of the present invention initiates connections to databases participating in the transaction without use of 2PC. In other words, the system optimistically presumes at the outset that 2PC will not be required. Next, the system reads in records required in the transaction from the databases. Subsequently, the system determines whether the transaction in fact results in changes to more than one database. How the system operates from this point on depends on this determination. In the instance that the transaction results in changes to no more than one database, the system may complete the transaction without use of 2PC. On other hand, if the transaction results in changes to more than one database, the system uses 2PC to complete the transaction.

All told, the improved method of the present invention improves overall performance by looking at each transaction to determine whether the transaction actually requires use of 2PC before incurring the overhead associated with use of 2PC. Because only a small percentage of transactions result in updates to more than one database, the approach of the present invention increases overall system performance considerably by avoiding 2PC overhead in the many instances where it is unnecessary.

DETAILED DESCRIPTION OF A PREFERRED EMBODIMENT

The following description will focus on the presently-preferred embodiment of the present invention, which is implemented in a three-tier system operating in an Internet connected environment, including client-side and server-side components (e.g., running under Microsoft® Windows XP). The present invention, however, is not limited to any particular application or any particular environment. Instead, those skilled in the art will find that the system and methods of the present invention may be advantageously applied to a variety of platforms and environments, whether command-line or GUI based, including Macintosh, UNIX, Linux, FreeBSD and the like. Therefore, the description of the exemplary embodiments which follows is for purposes of illustration and not limitation.

A. Basic System Hardware (e.g., for Desktop and Server Computers)

Figure 1:
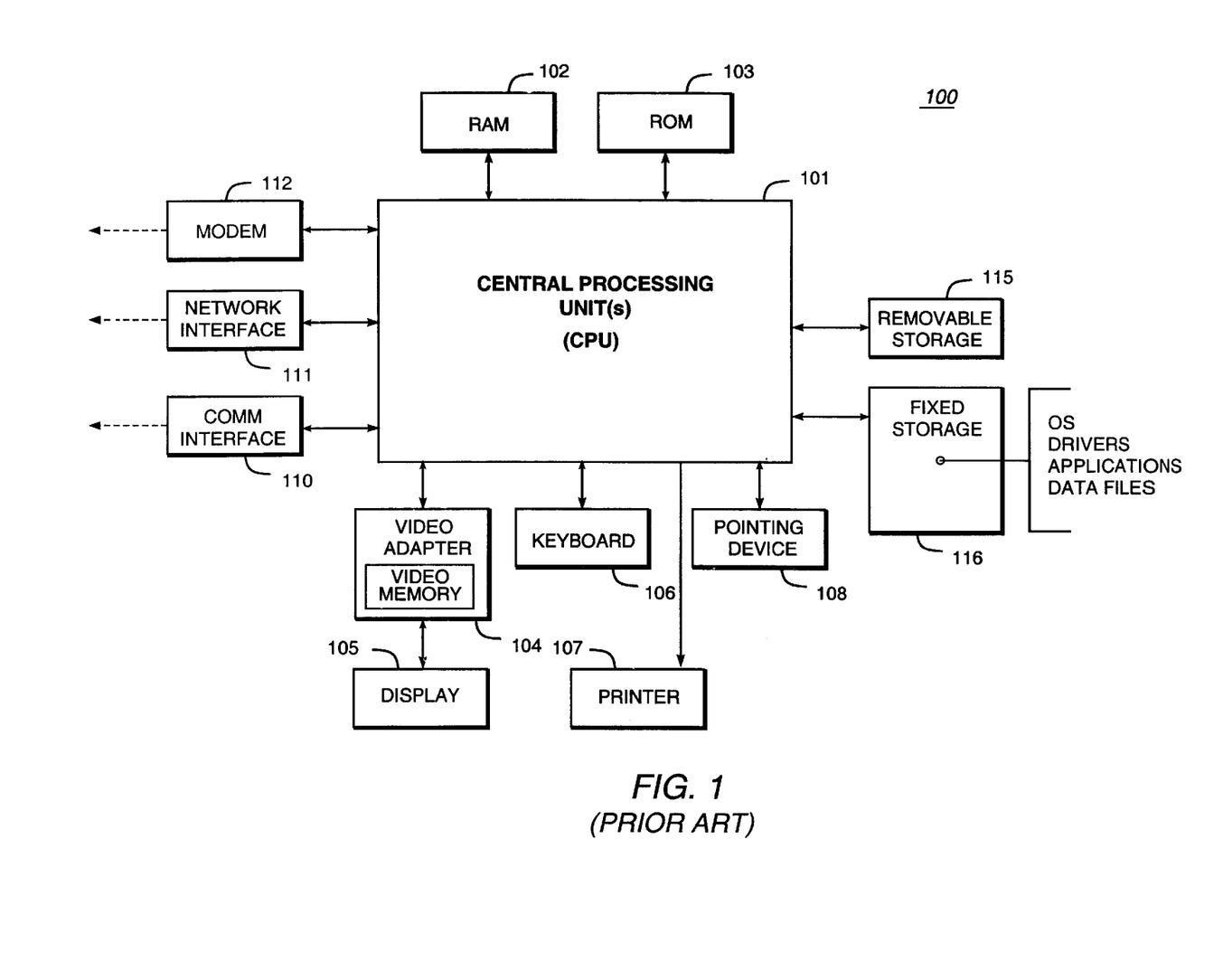
FIG. 1 is a block diagram of a (prior art) computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the system.

The computer system 100 displays text and/or graphic images and other data on the display device 105. The video adapter 104, which is interposed between the display device 105 and the system 100, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
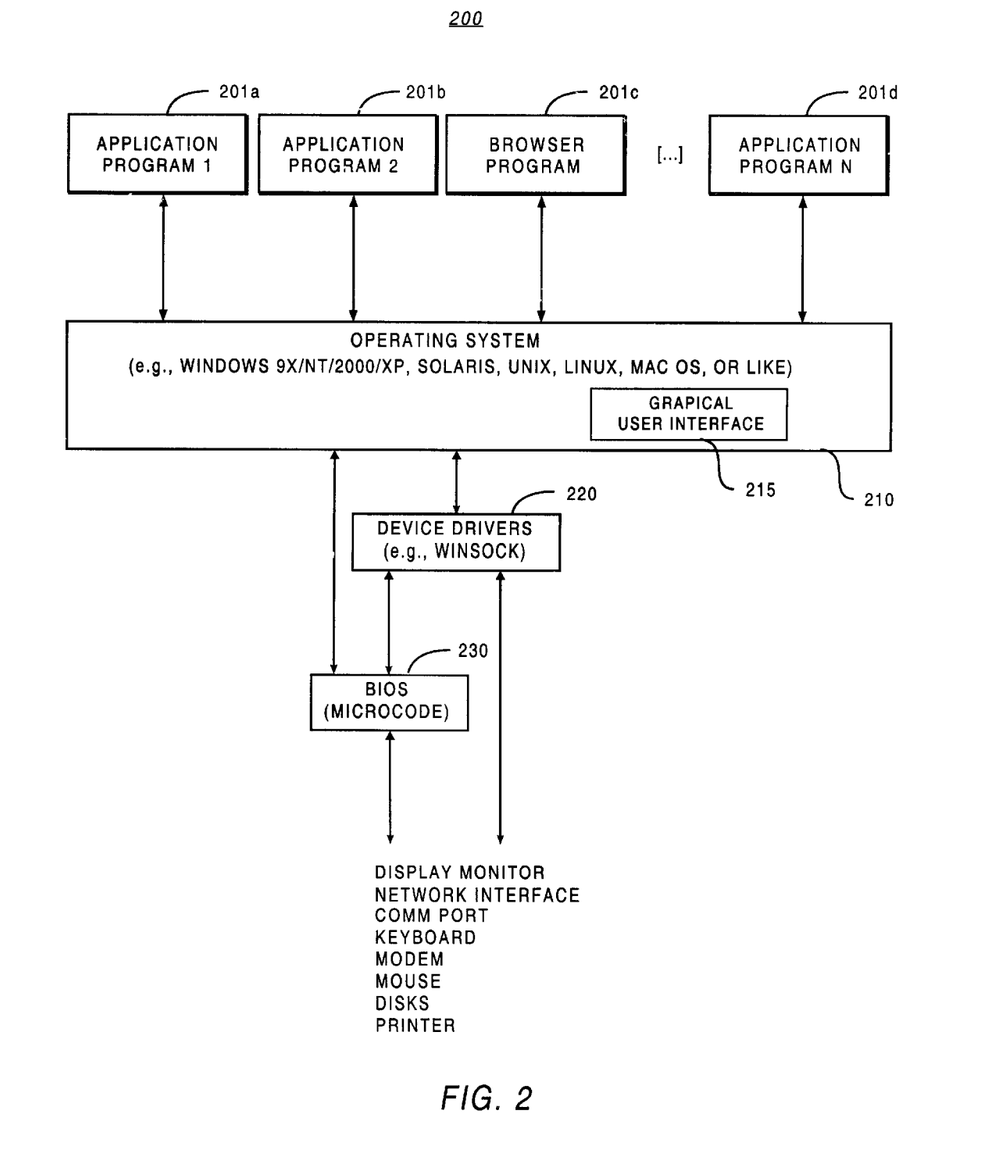
FIG. 2 is a block diagram of a software system for controlling the operation of the computer system shown in FIG. 1.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., middle-tier server, database server, and the like) that communicates with one or more "clients" (e.g., Java database client). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Improved Methodology for Two-Phase Commit Decision

A. Introduction to Basic Two-Phase Commit Processing

Many transactions involve a group of operations that need to be guaranteed to succeed fully or, if they do not succeed fully, to be undone (i.e., "rollback" operation) as if they were never begun. Using the same example previously discussed, an individual bank customer's transfer of $500 from his or her savings account to his or her checking account involves a pair of operations. The first operation is to remove (or debit) $500 from the savings account located on one database. The second operation is to add (or credit) $500 to the checking account on a second database. Both the bank and the account holder want a guarantee of integrity (or transaction "atomicity") to ensure that either both of these operations take place, or, if there is some problem in completing both operations, that neither of them take place. The following introduction discusses in more detail the operations of three-tier transaction processing systems and the two-phase commit protocol ("2PC").

Figure 3:
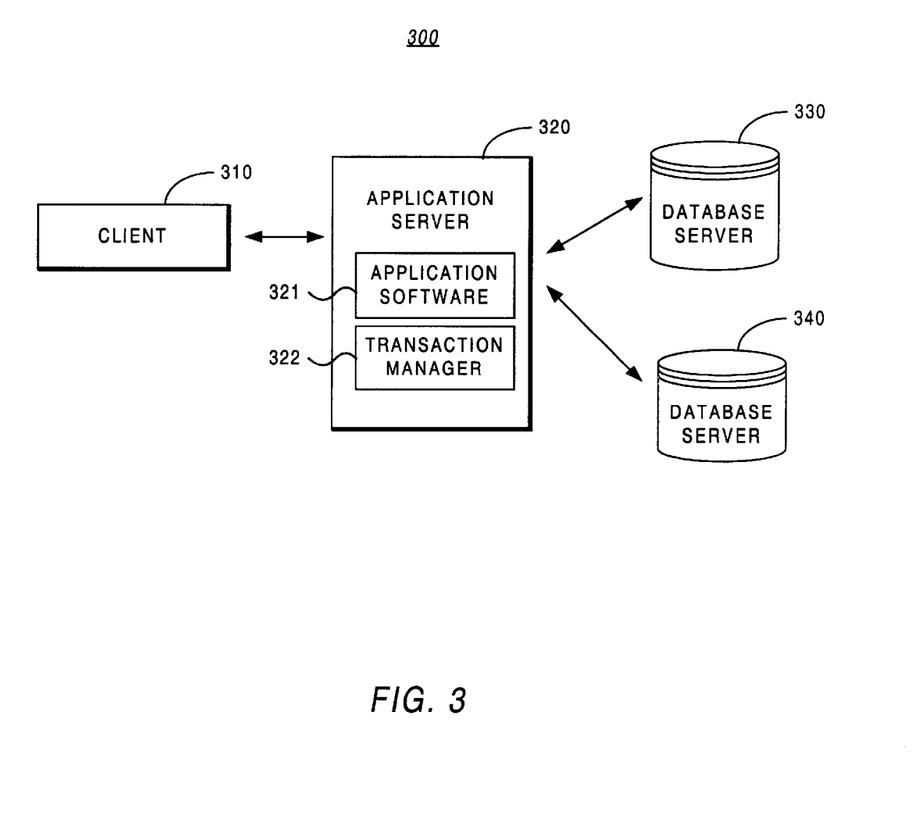
FIG. 3 is a block diagram of a three-tier transaction processing system.

FIG. 3 illustrates a block diagram of a three-tier transaction processing system 300. The system 300 includes at least one client machine 310 (and typically multiple client machines) connected to an application server 320 that, in turn, is connected to back-end database servers 330, 340. All of these components may be connected locally (e.g., via a LAN) or remotely (e.g., via a WAN, including the Internet). As shown, the application server 320 resides in the middle tier of the system and includes application software 321 and a transaction manager 332. Application software 321 includes software-implemented processes that are designed to solve specific user and/or business needs; for example, application software 321 may implement various "business rules" required for operating one's business. The transaction manager, on the other hand, is responsible for defining the scope of each transaction that executes within the system (i.e., which steps are parts of a given transaction) and for handling control of those transactions. The latter responsibility includes managing the 2PC process, including assigning a unique identifier of the transaction that can be shared with other components, and coordinating the interaction of other components to determine a transaction's outcome.

The two database servers 330, 340, which are connected to the application server 330 as shown, comprise the back-end or third tier. The database servers 330, 340 may also be referred to as "resource managers." A resource manager is responsible for maintaining a recoverable resource. The most common example of a resource manager is a database. However, a file system or even a printer can also be a resource manager. For construction of a preferred embodiment, conventional database management systems can be employed for the back-end database servers. Examples of suitable database systems include Borland Interbase® (available from Borland Software Corporation of Scotts Valley, Calif.), Sybase® Adaptive Server Enterprise (available from Sybase, Inc. of Emeryville, Calif.), and Oracle® 9i (available from Oracle Corporation of Redwood Shores, Calif.). The general construction and operation of a database management system, including "client/server" relational database systems, is known in the art; see e.g., the above-mentioned Date reference.

Transactional control within a transaction processing system, such as the system 300, occurs as follows. Initially, the application software executes, and at some point, decides to perform a transaction. Typically, any transaction, whether involving one database or multiple databases, is executed in two halves (note that the two "halves" of the transaction are distinct from the two "phases" of the completion of the transaction involved in two-phase commit). In the first half of the transaction, the application software first calls the transaction manager to start a transaction, and then makes whatever calls are appropriate to the databases to read the data necessary for the transaction (as desired for the underlying business logic addressed by the application software). Typically, these data reads proceed without the need to acquire exclusive locks on the underlying data, meaning that other transactions can simultaneously read the same data records. This first part of transaction is where the work of the transaction is done, but this work is done in temporary space and no permanent changes are written to the databases. This first half of the transaction is usually called the "read" half, because only "reads" (i.e., read operations) occur against the databases during this half of the transaction.

The second half of the transaction is referred to as the "write" half of the transaction. When the transaction is committed, the transaction processing system executes the second half of the transaction, by going back through the data, and performing the following steps:

1. (Optionally) Acquiring locks on all data (or a subset of all data);
2. (Optionally) Verifying that the underlying data store was not modified by a concurrent transaction; and
3. Updating the database to reflect any changes made by the current transaction.

In a transaction occurring in a transaction processing system, the activity of the various components of the system participating in the transaction is coordinated by the transaction manager. The transaction manager typically uses the previously mentioned two-phase commit (2PC) protocol to synchronize multiple resources and to provide the required guarantee of atomicity. The transaction manager next begins a series of interactions with the databases to inform the participating databases that a transaction is in process and that 2PC will be used. The transaction manager also provides an identification of the specific transaction to the participating database using an XA identifier (see, e.g., previously mentioned *Distributed TP: The XA Specification*).

In the first (or "Prepare") phase of 2PC, the transaction manager interrogates each database to see if it is prepared to commit. If the database is willing (or able) to guarantee durability of the changes, it will report back to the transaction manager that its preparation was successful and will also write a log record indicating that it is willing to make the requested changes. The log record also includes the identifier of the transaction provided by the transaction manager. The log record and identifier enable the specific transaction to be recovered in the event a database fails after notifying the transaction manager that its preparation was successful.

The transaction manager collects responses from all databases to the Prepare request. If all databases reply that they have successfully prepared, the transaction manager can then decide that the transaction is able to commit successfully, and as the second (or "Commit") phase, informs all of the resource managers to commit their data. When committed, all changes made by the transaction become durable. The second phase of the commit process terminates when each of the databases has committed its respective part of the transaction, made it durable, and sent a confirmation of completion to the transaction manager.

Of course, one or more databases may refuse (or be unable) to prepare. For example, there may be times when a database cannot guarantee that it can reliably make and durably store the requested change; for example, a disk may drop off-line, a file may run out of quota, or one of numerous other conditions may occur to preclude making the change. In this circumstance, the database would either report to the transaction manager that it was unable to prepare itself for commitment or would not make any report to the transaction manager. If the transaction manager does not receive a positive report (referred to as a vote commit) from all participants in the transaction, it concludes that the transaction is unsuccessful and must be rolled back. In this situation, the transaction manager would issue rollback commands to all databases as its second phase. The respective rollback commands would each identify the specific transaction being rolled back using the XA identifier. Rolling back a transaction returns all data to the state it was in before the transaction started. Once all resource managers have rolled back their data, the system is again in a consistent state and it appears as if the transaction had never started. A more comprehensive discussion of transaction processing systems and the two-phase commit protocol is available in the technical, trade, and patent literature, such as in *Transaction Processing: Concepts and Techniques*, in *Distributed TP: The XA Specification*, and in *Distributed TP: Reference Model, Version* 3, all previously referenced above.

The two-phase commit protocol has been widely used for a number of years to provide this guarantee of atomicity in transaction processing systems. However, the approach is problematic since a significant performance price must be paid as a result of the additional steps and operations required by the protocol. The present invention includes improved methodology for addressing this problem.

B. Overview of Improved Two-Phase Commit Processing

In general, most real world transactions on transaction processing systems do not access multiple data sources. Rather, in a majority of transactions only one data source is accessed. In addition, transactions typically read from databases much more frequently than they write to databases. Thus, an even smaller percentage of transactions result in updates (changes) being written to more than one database. These aspects of transaction processing are exploited by the present invention for providing improved two-phase commit processing.

If a transaction only involves reading data or only results in updates to one database, use of 2PC is not required. In these cases, use of 2PC provides an unnecessary performance overhead on the transaction. Although the number of transactions resulting in updates to multiple databases is exceedingly low, existing transaction processing systems typically require use of 2PC for every transaction to correctly handle the rare instance when updates occur to multiple databases. This results in a considerable performance penalty on the operations of the transaction processing system.

One approach to address these problems is to annotate each transaction in the application software to specify whether or not that specific type of transaction requires 2PC. For example, if a bank customer is only checking the balances in his or her checking account or savings accounts, this is not a transaction that will involve updates to more than one database (even if the accounts are in different databases), so use of 2PC is not required. This transaction, therefore, may be flagged in the application software as a transaction not requiring 2PC and, thus, the transaction manager initiates and handles the transaction without the use of 2PC. The prior example of a transaction involving a transfer of funds between two accounts, on the other hand, is flagged as a transaction that requires two-phase commit as the accounts may be maintained on different databases. Such transactions that may involve updates to more than one database are flagged as requiring use of the two-phase commit protocol and the transaction manager would obtain an XA connection to the database for transactions of this type. Identifying and flagging the transactions requiring 2PC at the middle-tier application server level in this fashion enables a significant overall performance improvement for an application as the overhead associated with 2PC is avoided for a large number of transactions where it is not needed.

As an enhancement to the foregoing approach, the present invention also provides an improved method for automatically invoking 2PC only when it is really needed—that is, in a fashion that does not require manual configuration in the manner described above. Using this improved methodology, a given transaction may be handled without use of 2PC until is determined that the transaction does, in fact, involve updates to more than one database. In other words, the system optimistically presumes that 2PC is not required for a given transaction; at least until such time that the system uncovers additional facts to rebut that presumption. When it is determined that a transaction involves updates to more than one database, the non-XA connections are released and XA connections are allocated to complete the transaction using 2PC as described more specifically below. Although this may result in somewhat poorer performance on those transactions requiring 2PC processing, because only a small percentage of transactions result in updates to more than one database, the overall performance of the system is improved considerably.

This improved methodology also avoids the need to manually configure each application (as provided under the first approach), which may be tedious and error prone. It also results in an overall performance improvement over both the first approach (as well as compared with use of 2PC every time) because many transactions that might possibly require 2PC do not actually result in updates to multiple databases. Experience indicates that a majority of transactions result in either no updates or updates to only one database. However, if the decision about whether or not to use 2PC must be hard-coded in advance for a particular type of transaction, then the decision must be made pessimistically. As a result, 2PC must be specified, even if a vast majority of the time a particular type of type transaction does not result in updates being made to more than one system. The approach of the present invention improves overall performance by looking at each transaction as it occurs to determine if, in fact, it actually requires use of 2PC before incurring the overhead associated with use of the two-phase commit protocol. In this manner, the transaction processing system of the present invention may apply 2PC protocol selectively.

C. Modifications to Transaction Processing System

Figure 4:
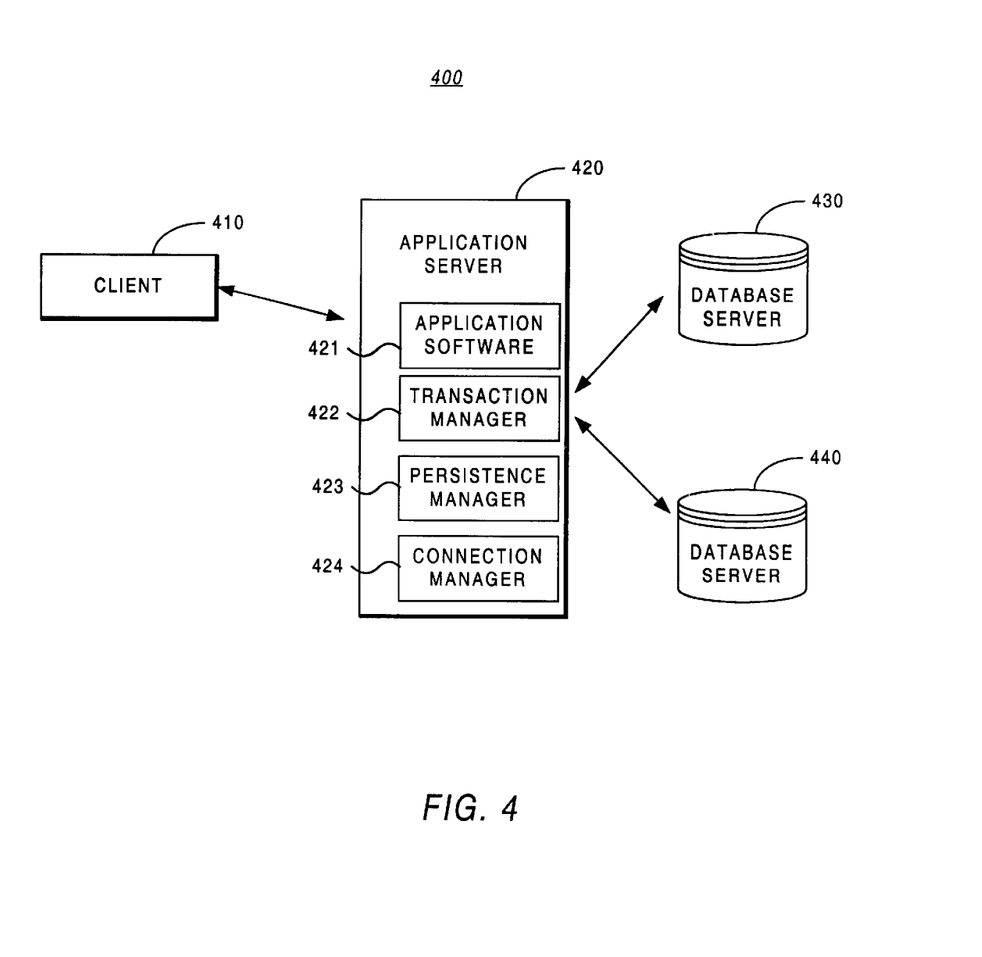
FIG. 4 is a block diagram of a preferred three-tier transaction processing system in which the present invention is embodied.

FIG. 4 illustrates a high-level block diagram of a preferred three-tier transaction processing system 400 of the present invention, which may be created by modifying the previously described system 300 of FIG. 3. As shown, the system 400 includes one or more client machines 410 connected either locally or remotely (e.g., via the Internet) to an application server 420, which is in turn connected to back-end databases 430, 440. Each component will next be described in greater detail.

The client machine(s) 410 communicates with application software 421 which is installed on the application server 420 which is in the middle tier of the system. Basic services of the application server 420 (e.g., serving of application components) may be provided by an existing application server, such as Borland's AppServer® (available from Borland Software Corporation of Scotts Valley, Calif.). The application server 420 includes a transaction manager 422, a persistence manager 423, and a connection manager, as depicted in FIG. 4. The application server 420 communicates with two (or more) database servers 430, 440, which provide back-end database support (e.g., in the manner previously described for database servers 330, 340 in FIG. 3)

As in the case of the application server 320 of FIG. 3, the application software 421 of FIG. 4 resides on a middle tier machine and includes program logic designed to solve specific user and/or business needs. The transaction manager 422 is responsible for defining the scope of a transaction, that is, which steps are parts of a transaction. Another responsibility of transaction manager 422 is assigning a unique identification of the transaction that can be shared with other components, and coordinating the other components to determine a transaction's outcome. The persistence manager 423 manages the persistence (e.g., storage) of data by controlling all reads and writes of data by the application software 421 to database servers 430, 440. The connection manager 424 manages the connections to the database servers 430, 440. The connection manager 424 maintains a pool of XA and non-XA connections and assigns them as needed in conjunction with transactions reading or writing data. The database servers 430, 440 act as resource managers controlling access, use, and modification of data that they maintain in persistent storage. Detailed operation of the system 400 will next be described.

D. Operation of Improved Transaction Processing System

As previously described, all transactions consist of two halves (not to be confused with the two phases of 2PC). The first (or read) half of the transaction involves the reading and processing of data by the application software. In this half, all updates to the database are made and held by the application software in temporary space (e.g., memory and/or disk space present at the middle tier). No changes are made to the data in persistent storage until after changes are committed in the second half of the transaction. Accordingly, for the first half of the transaction, non-2PC enabled (i.e., non-XA) connections can be used as none of the participating databases are being updated.

At the end of the first half of the transaction and immediately prior to commitment of changes to the database or databases participating in the transaction, all of the calculations and other work of the application have been completed. At this point, the transaction processing system of the present invention can clearly determine what updates need to be made and whether or not the currently executing transaction will result in updates to more than one database. Very frequently, in fact, there will be no updates to any database and, therefore, the entire transaction can be completed without use of 2PC. In a number of other cases, updates are written to only one database, and in that instance changes written to the single database can also be completed without 2PC. Thus, in both these cases the overhead of using 2PC is avoided, thereby resulting in a significant overall performance increase.

In a much smaller percentage of situations, a transaction will involve updates to multiple databases. When this fact is determined, then the transaction must be partially or completely redone using 2PC, as the two-phase commit protocol must be used from the outset of the transaction and cannot be initiated part way through the processing of the transaction. The transaction processing system must allocate XA connections to all participating databases before any updates occur, so that the databases can log and record the necessary information required by the two-phase commit protocol.

Several approaches exist that can be used in this situation to redo the transaction using 2PC. For example, applying a more conservative approach, the transaction processing system may double-check the validity of all of the work of the application done in the first half of the transaction, by rereading data from the participating databases. This ensures consistency, in other words making sure the data being used in the transaction is current and up-to-date. As another alternative, the transaction processing system may choose to only verify that any updated records are consistent with the values read previously in the transaction. This prevents inconsistent updates to the database, without requiring that all records be reread to ensure complete read-level consistency. Those skilled in the art will appreciate other techniques that may be applicable for redoing transactions using 2PC.

E. Detailed Internal Operation of Improved Transaction Processing System

Figure 5A:
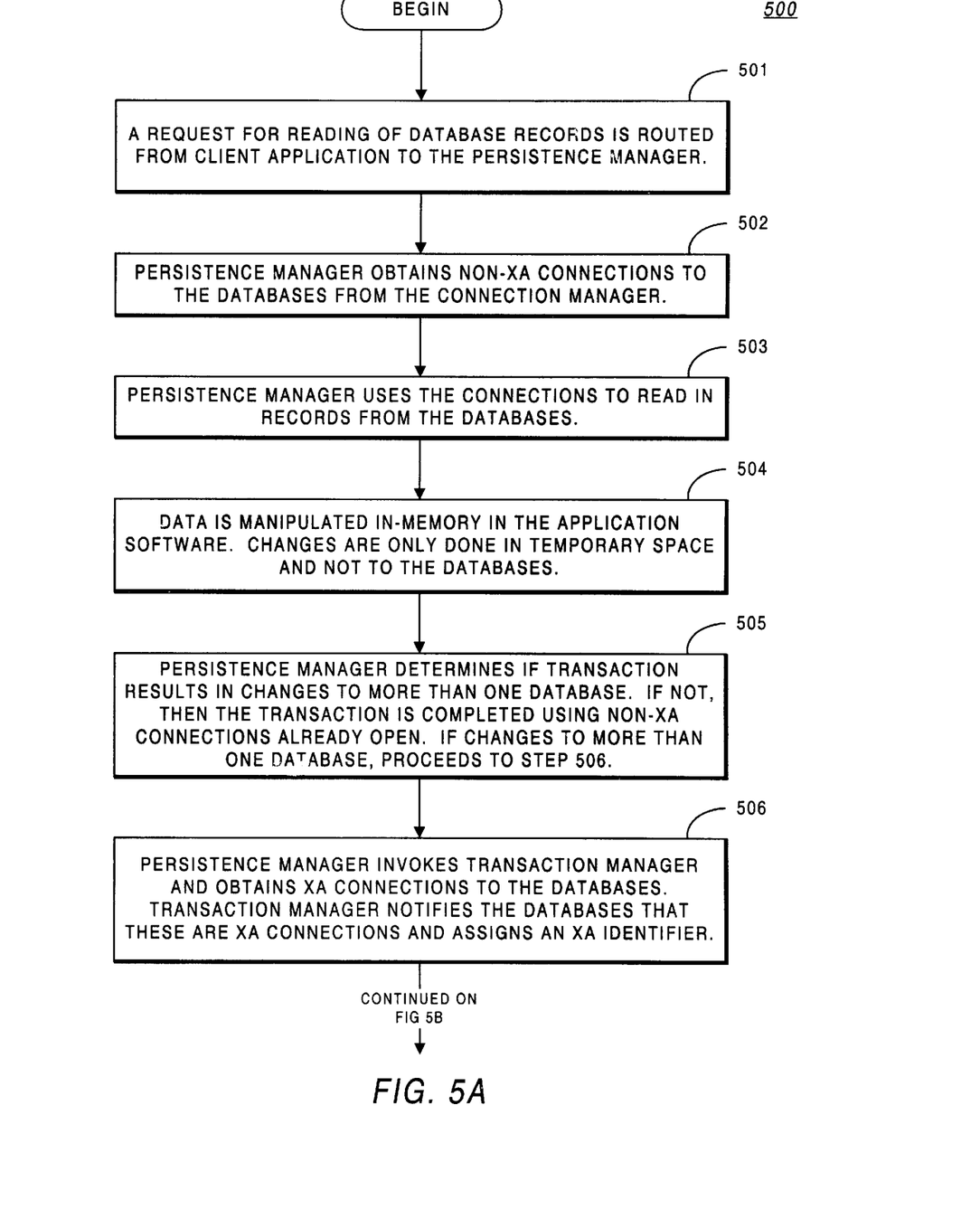
FIGS. 5A–B comprise a single flowchart illustrating methodology of the present invention for improved two-phase commit decision processing.
Figure 5B:
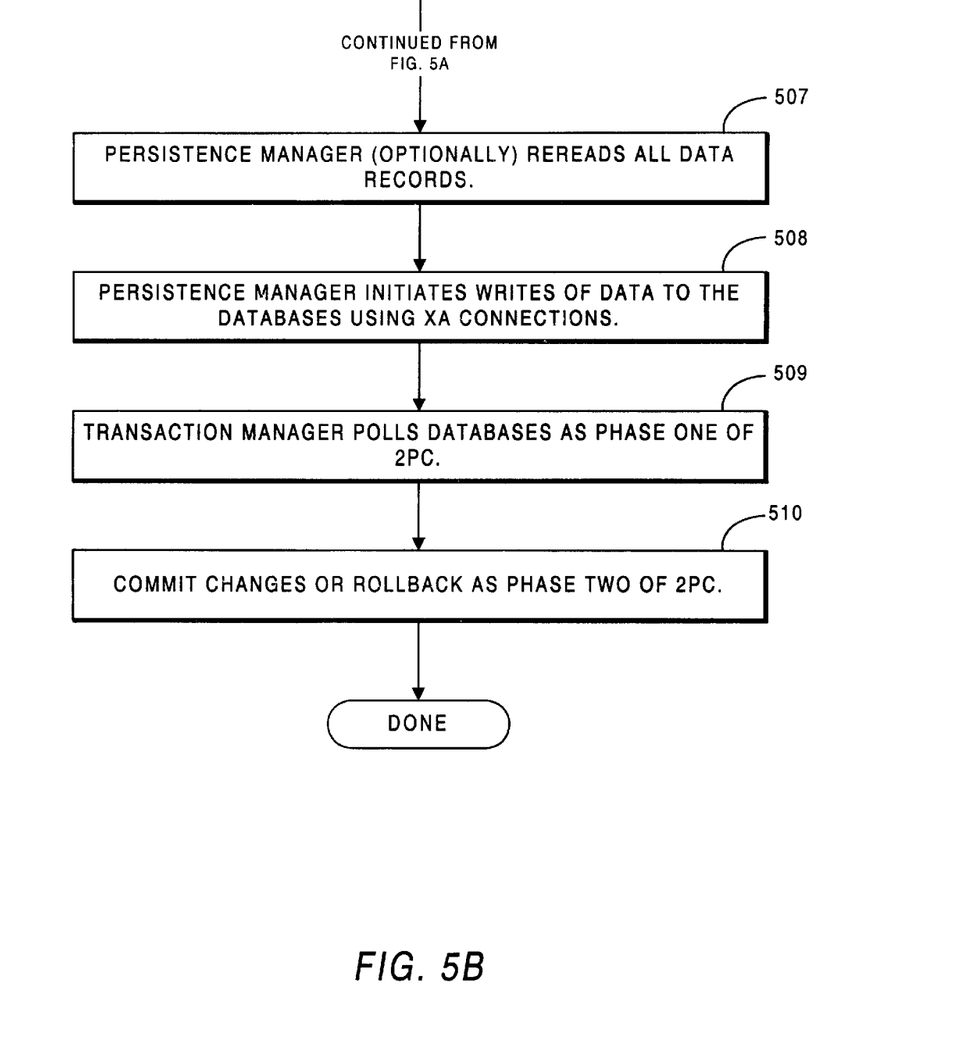

FIGS. 5A–B comprise a single flow diagram illustrating detailed method steps of the improved two-phase commit methodology of the present invention, including illustrating the specific operation of the persistence manager and the transaction manager during execution of a transaction that may require 2PC support. The specific method steps are as follows:

Step 501. A transaction that requires the reading of a set of records (potentially, from multiple databases) is initiated. For example, a bank customer may ask to review the balance in his or her checking account and in his or her savings account. The customer's request for reading of these records is routed from the application software to the persistence manager.

Step 502. The persistence manager obtains non-XA connections to the corresponding database or databases from the connection pool that is managed by the connection manager. In this example, if the customer's checking account and savings account are maintained in two different databases, then the persistence manager obtains two non-XA connections, one for each database.

Step 503. The persistence manager uses these connections to read in a set of records from each of the databases participating in the transaction (in this example, the balances in both checking and savings) and this information is returned to the customer.

Step 504. Next, changes are processed in temporary memory space. For example, if the customer looks at the balances and decides to transfer $500 savings to checking, this is an event that may potentially affect two back-end databases given that the checking and savings account are stored in different databases. In that instance, some data is manipulated and writes occur to an in-memory representation of the savings accounts (decrement balance by $500) and the checking account (increment balance by $500). Thus at this step, these writes (or changes) are only done in temporary space at the middle tier application server and not to the databases at this point of the transaction.

Step 505. The transaction processing system may now determine whether 2PC processing is required. At the end of the first half of the transaction and before changes are written to the databases, in this step 505 the persistence manager evaluates the changes that are being made and determines whether or not the transaction results in write operations (changes) to more than one database. If there are no changes to any databases, the transaction requires no further work before the transaction may conclude. If there are changes written to only one database, then the transaction can be completed using the appropriate non-XA connection that is already open. In this case, the changes are committed to the appropriate database and the transaction is completed. If, however, the persistence manager determines that there are changes to more than one database, then it must proceed to step 506. In this example, 2PC processing is required as there are changes to both the checking account database and the savings account database; thus, the transaction proceeds to step 506.

Step 506. As the transaction requires 2PC, the persistence manager invokes the transaction manager and obtains two XA connections to the participating databases (the checking account and savings account databases in this example). The transaction manager notifies the participating databases that these are XA connections and assigns an XA identifier for the transaction. The non-XA connections are returned to the connection manager (e.g., returned to a connection pool for use by other transactions).

Step 507. (Optional). The persistence manager may (optionally) go back and redo some or all of the data reads from the first half of the transaction to make sure that the data is consistent.

Step 508. The persistence manager initiates the writes of data received from the application to the participating databases using the XA connections it has obtained from the connection manager.

Step 509. The transaction manager polls all participating databases (phase one of 2PC as previously described) to determine if they can commit the changes. In this example, the transaction manager polls both the savings account and checking account databases.

Step 510. If all participating databases respond "vote commit" to the transaction manager, then the transaction manager instructs them to commit the changes (phase two of 2PC as previously described). If both the checking account and savings account databases respond affirmatively ("vote commit"), then the transaction is completed by committing the changes that debit savings by $500 and credit checking by $500. However, if all participating databases do not respond "vote commit", then the transaction manager instructs them to roll back the changes, whereupon the databases are returned to their prior consistent states.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. An improved method for providing two-phase commit protocol (2PC) in a transaction processing system in communication with at least two databases, the method comprising:

in response to a transaction initiated by a client in a transaction processing system comprising at least a three-tier system including at least one client, a middle-tier application server and at least two databases allocating connections to databases participating in said transaction without use of 2PC;

reading in records required in said transaction from said databases;

determining at the middle-tier application server whether or not said transaction results in changes to more than one database;

if said transaction results in changes to no more than one database, completing said transaction without use of 2PC and without use of XA connecitons to databases participating in the transaction; and if said transaction results in changes to more than one database using XA connections to databases participating in the transaction and using 2PC to complete said transaction at all databases participating in the transaction.

2. The method of claim 1, wherein said databases include file systems.

3. The method of claim 1, wherein said databases include other resource managers.

4. The method of claim 1, wherein said connections initially allocated to said databases participating in said transaction comprise non-XA connections.

5. The method of claim 1, wherein 2PC is not used if said transaction involves only reading of data.

6. The method of claim 1, wherein non-XA connections are used if said transaction involves only reading of data.

7. The method of claim 1, wherein 2PC is not used if said transaction involves only changes to one of said databases.

8. The method of claim 1, wherein non-XA connections are used if said transaction involves changes to only one of said databases.

9. The method of claim 1, wherein said middle-tier application server determines whether said transaction requires use of 2PC.

10. The method of claim 1, wherein said middle-tier application server manages a pool of XA connections and non-XA connections to said participating databases.

11. The method of claim 1, wherein said middle-tier application server determines if said transaction requires use of XA connections.

12. The method of claim 1, wherein said middle-tier application server includes a persistence manager that determines whether said transaction requires use of 2PC.

13. The method of claim 1, wherein said middle-tier application server coordinates use of 2PC if said transaction results in changes to more than one database.

14. The method of claim 1, wherein said middle-tier application server invokes a transaction manager if said results in changes to more than one database.

15. The method of claim 14, wherein said transaction manager assigns an XA identifier only when said transaction is determined to result in changes to more than one database.

16. The method of claim 14, wherein transaction manager uses 2PC to complete said transaction.

17. The method of claim 14, wherein said transaction manager serves as a transaction coordinator for completion of said transaction using 2PC.

18. The method of claim 1, wherein said middle-tier application server includes a persistence manager controlling reading and writing of data to said databases.

19. The method of claim 18, wherein said persistence manager determines whether said transaction results in changes to more than one database before writing any data.

20. The method of claim 18, wherein said persistence manager uses 2PC for writing data only when said transaction results in changes to more than one database.

21. The method of claim 18, wherein said persistence manager obtains XA connections to said databases if said transaction results in changes to more than one database.

22. The method of claim 18, wherein said persistence manager uses non-XA connections to said participating databases if said transaction does not results in changes to more than one database.

23. The method of claim 1, wherein said step of determining whether or not said transaction results in changes to more than one database includes the substeps of:

making changes resulting from said transaction in temporary space; and evaluating said changes to determine if said transaction results in changes to more than one database.

24. The method of claim 1, wherein said step of determining whether or not said transaction results in changes to more than one database is made before said changes are written to said databases.

25. The method of claim 1, wherein said step of determining whether or not said transaction results in changes to more than one database is made before said changes are committed to said databases.

26. The method of claim 1, wherein said step of determining whether or not said transaction results in changes to more than one database is made before said changes are being written to said databases and before said changes are committed to said databases.

27. The method of claim 1, wherein said step of using 2PC to complete said transaction results includes the substeps of:

obtaining XA connections to all databases participating in said transaction;

assigning an XA identifier for said transaction;

initiating writing of said changes to said participating databases using XA connections;

polling said participating databases to determine if all said databases can commit said changes;

if all said databases respond affirmatively, instructing all said database to commit said changes and complete said transaction; and if at least one of said databases does not respond affirmatively, instructing all said databases to roll back said changes.

28. The method of claim 27, further comprising:

upon determining that said transaction requires use of 2PC, rereading all data records prior to initiating changes to said participating databases.

29. The method of claim 27, further comprising:

upon determining that said transaction requires use of 2PC, rereading a portion of the data records prior to initiating changes to said participating databases.

30. An improved method for providing two-phase commit protocol (2PC) in a transaction processing system in communication with at least two databases, the method comprising:

in response to a transaction initiated by a client in a transaction processing system comprising at least a three-tier system including at least one client, a middle-tier application server and at least two databases performing a read portion of said transaction by performing the substeps of:

obtaining data from databases participating in said transaction, and processing any changes to said data made in the transaction in temporary space;

before writing said changes to said databases, determining at the middle-tier application server how many database are to be changed during a write portion of said transaction;

if no more than one database is to be changed in said transaction, completing the write portion of said transaction without use of 2PC and without use of XA connections to databases participating in said transaction and;

if more than one database is to be changed in said transaction using XA connections to database participating in said transaction and, using 2PC to complete the write portion of said transaction at all databases participating in the transaction.

31. The method of claim 30, wherein said substep of obtaining data from said databases participating in said transaction includes obtaining non-XA connections to said databases.

32. The method of claim 30, wherein 2PC is not used if said transaction involves only reading of data.

33. The method of claim 30, wherein non-XA connections are used if said transaction involves only reading of data.

34. The method of claim 30, wherein 2PC is not used if said transaction involves changes to only one of said databases.

35. The method of claim 30, wherein non-XA connections are used if said transaction involves changes to only one of said databases.

36. The method of claim 32, wherein said middle-tier application server determines whether said transaction requires use of 2PC.

37. The method of claim 32, wherein said middle-tier application server coordinates use of 2PC when said transaction results in changes to more than one database.

38. The method of claim 32, wherein said step of using 2PC to complete said transaction includes the substeps of:

obtaining XA connections to all databases that participate in said transaction;

assigning an XA identifier for said transaction;

initiating writing of said changes to said participating databases using XA connections;

polling said participating databases to determine if all said databases can commit said changes;

if all said databases respond affirmatively, instructing all said databases to commit said changes and complete said transaction; and if at least one of said databases does not respond affirmatively, instructing all said databases to roll back said changes.

39. The method of claim 38, further comprising:

upon determining that said transaction requires use of 2PC, rereading all data records prior to initiating changes to said participating databases.

40. The method of claim 38, further comprising:

upon determining that said transaction requires use of 2PC, rereading a portion of the data records prior to initiating changes to said participating databases.

41. An improved method for providing two-phase commit protocol (2PC) in a transaction processing system capable of accessing at least two databases, the method comprising:

in a transaction processing system comprising at least a three-tier system including at least one client, a middle-tier application server and at least two databases,     determining at the middle-tier application whether each transaction performed in said transaction processing system may result in changes to more than one database;

annotating each transaction that may result in changes to more than one database to indicate that use of 2PC are XA connections and required for said each transaction at all databases participating in said each transaction; and     in response to each specific transaction initiated by a client, using XA connections and 2PC for transactions annotated as requiring XA connections and 2PC and completing all other transactions without use of XA connections and without use of 2PC.

42. An improved transaction processing system for selectively using two-phase commit protocol (2PC) for transactions that access multiple databases, said system comprising:

at least one client connected to a middle-tier application server;

a network providing access at the middle-tier application server to databases that participate in a particular transaction;

a persistence manager for at the middle-tier application server determining if more than one participating database is changed in said particular transaction and initiating use of XA connections and 2PC at all databases participating in the transaction only when said particular transaction results in changes to more than one database; and     a transaction manager that coordinates completion of said particular transaction, said transaction manager only employing XA connections and 2PC to databases participating in said particular transaction when said persistence manager has determined that more than one participating database is changed by said particular transaction.

43. The system of claim 42, wherein said persistence manager makes changes required by a particular transaction in temporary space to determine whether more than one database is changed as a result of said transaction.

44. The system of claim 42, wherein said persistence manager controls reading and writing of data to said databases.

45. The system of claim 42, wherein said persistence manager determines whether said transaction results in changes to more than one database before changes are written to said databases.

46. The system of claim 42, wherein said persistence manager determines whether said transaction results in changes to more than one database before changes are committed to said databases.

47. The system of claim 42, wherein said persistence manager determines whether or not said transaction results in changes to more than one database as changes are being written to said databases and before said changes are committed to said databases.

48. The system of claim 42, wherein said transaction manager assigns an XA identifier for said particular transaction, when said particular transaction results in changes to more than one database.

49. The system of claim 42, further comprising:

a connection manager maintaining a pool of XA and non-XA connections to said participating databases.

50. The system of claim 49, wherein said transaction manager only obtains XA connections to said databases from said connection manager when said persistence manager has determined that said particular transaction results in changes to more than one database.

51. The system of claim 49, wherein said persistence manager initiates writing of data to the participating databases using XA connections obtained from the connection manager.

52. The system of claim 42, wherein said transaction manager polls each participating database to respond whether it can commit its respective changes made in said transaction and, based on responses received, instructs said databases whether to commit said changes.

53. The system of claim 46, in which said middle-tier application server includes said transaction manager.

\* \* \* \* \*